C. V. B. DOWNING.
Automatic Cut-Off and Governor.
No. 227,967.    Patented May 25, 1880.
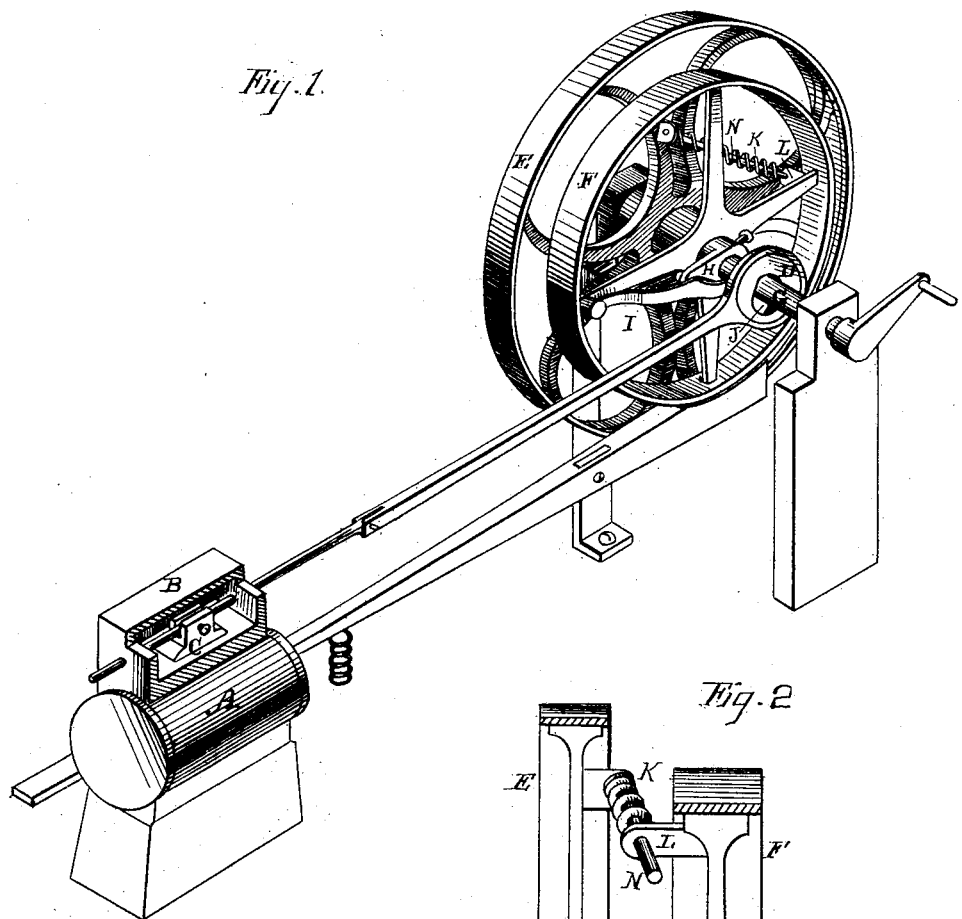
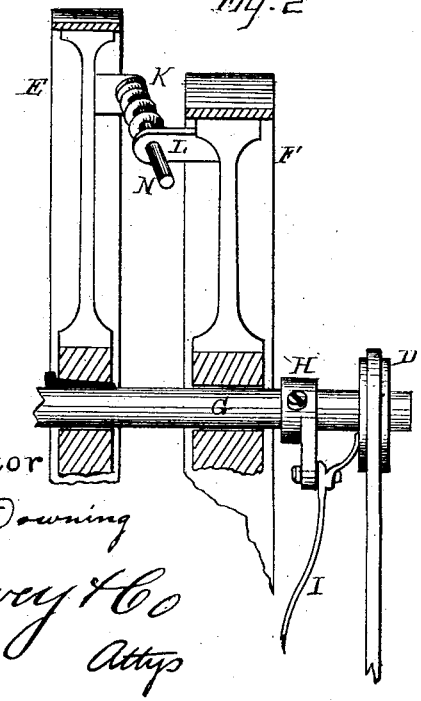
Witnesses  Inventor
Frank A. Brooke  Clarence V. B. Downing
Geo. H. Strong  By Dewey & Co
  Attys

UNITED STATES PATENT OFFICE.

CLARENCE V. B. DOWNING, OF SAN FRANCISCO, CALIFORNIA.

AUTOMATIC CUT-OFF AND GOVERNOR.

SPECIFICATION forming part of Letters Patent No. 227,967, dated May 25, 1880.

Application filed January 31, 1880.

*To all whom it may concern:*

Be it known that I, CLARENCE V. B. DOWNING, of the city and county of San Francisco, and State of California, have invented an Improved Automatic Cut-Off and Governor; and I hereby declare the following to be a full, clear, and exact description thereof.

My invention relates to certain improvements in controlling the quantity of steam which is admitted to the cylinders of steam-engines, and it may also be applied to any engine which is driven by a vapor, gas, or fluid under pressure.

It consists in varying the size of the openings by which steam is admitted into the cylinder by means of a novel mechanism, which is so connected with the engine-shaft that the opening made by the valve in passing over the port is altered by the increase or decrease of the load upon the shaft, thus forming a cut-off and governing device, which is adjusted by the increase or decrease of the work, as will be more fully described by reference to the accompanying drawings, in which—

Figure 1 is a view of my apparatus, showing its application to an engine. Fig. 2 is a section of the same.

A is the cylinder; B, the steam-chest, and C the slide moving within the steam-chest.

I have shown my invention applied to this form of engine; but it will be manifest that it is equally applicable to engines using puppet-valves, and to other forms, with slight modifications of some of the parts. In the present case the valve is actuated by an eccentric, D, and it will be seen that the stroke of the valve will depend upon the throw of the eccentric. The throw of the eccentric is made variable, as hereinafter described.

To illustrate this part of my invention I have shown two pulleys or wheels, E and F, the first of which is keyed to the shaft G, while the other is fitted to turn loosely upon the shaft by the side of the first. An arm or crank, H, is keyed to the shaft by the side of the loose pulley, and a lever, I, fulcrumed upon this crank, has its outer end pivoted near the rim of the pulley, while its inner end has the eccentric D secured to it. The eccentric has an oblong opening, J, made in it, through which the shaft passes, but it is not secured therein. The eccentric is thus supported by the lever-arm I so as to inclose the shaft, but independent of it, so that when the pulley F is turned in one direction upon the shaft its action upon the lever will cause the eccentric to move to one side, and when the pulley is turned in the opposite direction the lever will move the eccentric to the other side, the oblong slot allowing this movement. By this action the eccentric is moved out or in upon the shaft, and the movement of the valve is thus increased or diminished by this increase or decrease of the throw of the eccentric.

In order to regulate the action of the lever and make it dependent upon the load or the torsional strain upon the shaft, the pulleys E and F are united by a spring or weight, which is adjusted so that it will allow the engine-shaft to turn within the loose pulley when a certain amount of pressure is brought upon this loose or driving pulley.

In the present case I have shown a spring, K, which is fixed between the pulleys E and F, so that its tension must be overcome by the action of the load to turn the loose or driving pulley. This spring is shown as a coiled spring, having a rod, N, extending through its center to keep it in place. One end of this rod is fixed to a lug upon the outer wheel, E, while the opposite end slides through a lug, L, upon the wheel F. This lug L is made to turn slightly in its socket to allow the rod to accommodate itself to the rotation of the pulley F upon its axis with relation to the fixed pulley. In some cases a flat elliptic or other spring might be employed; but in either case a screw or other suitable means will be employed to regulate its tension to the power which is designed to move the eccentric and change the opening of the valve.

The operation will then be as follows: The pulley F represents any driving device, either a belt-pulley, gear-wheel, or a propeller. When the load applied to it is constant and at its minimum the force of the spring will be sufficient to hold this pulley back, so that the lever I will retain the eccentric at a point which will give the valve the minimum opening. Whenever the load increases sufficiently to overcome the resistance of the spring the pulley F will turn upon the shaft, and by means of the lever I, will move the eccentric so as to change its center of motion and increase its throw, and this will increase the opening of the valve proportionately with the increased load.

Any sudden increase or decrease, such as would result from the racing of a propeller in a heavy sea, or the sudden change of load in other cases where the engine ordinarily undergoes severe strains, would be instantaneously compensated by a change in the opening of the valve, and this change is so rapidly effected that the speed of the engine would not be perceptibly altered.

Having thus described my invention, what I claim as new, and desire to secure by Letters Patent, is—

The lever or pulley E, secured to the engine-shaft and united with the loose driving-pulley F by the spring K, in combination with the valve-actuating eccentric D, the lever I, and crank-arm H, whereby the center of motion of the eccentric may be changed by the variation of the load, and the opening of the valve increased or diminished, substantially as herein described.

In witness whereof I have hereunto set my hand.

C. V. B. DOWNING.

Witnesses:
GEO. H. STRONG,
S. H. NOURSE.